June 16, 1936.  F. A. GUST  2,044,682
RECEPTACLE HANDLE
Filed Nov. 7, 1935
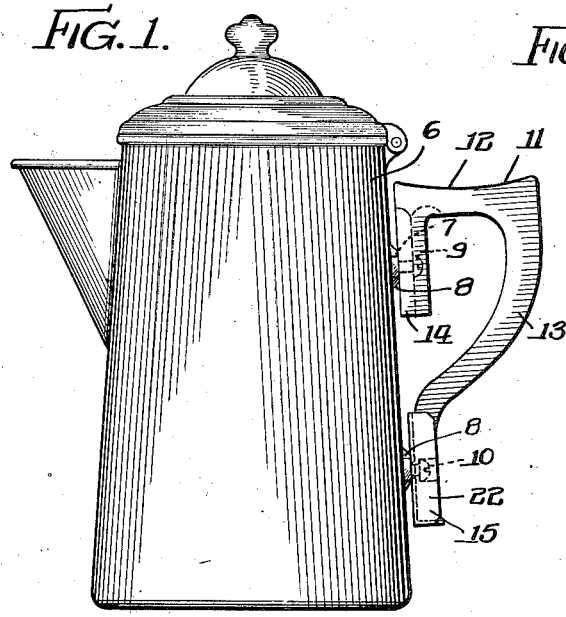
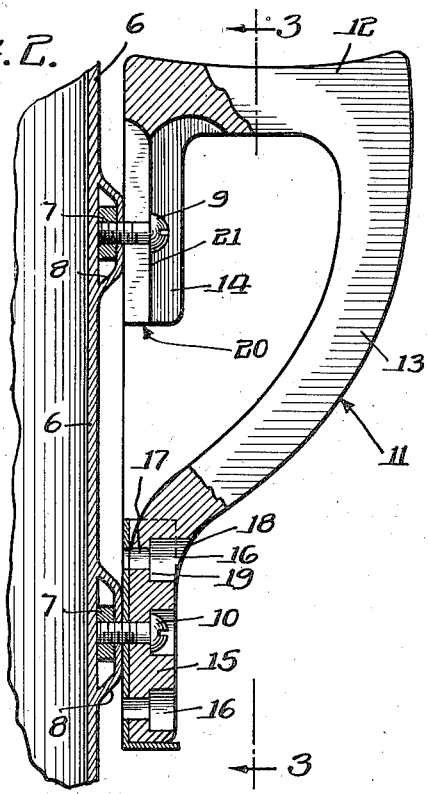
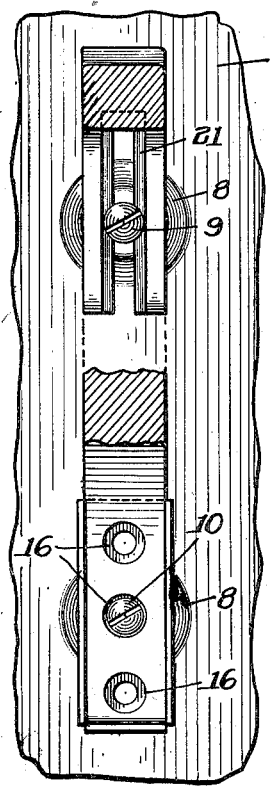
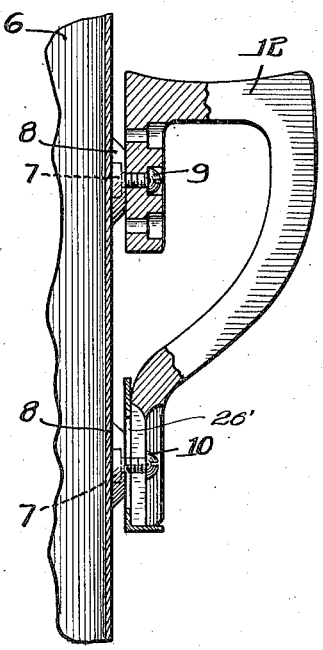
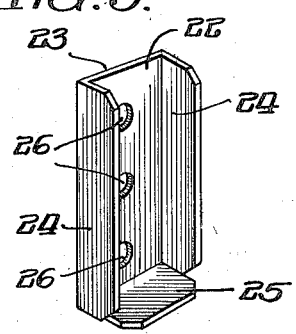
INVENTOR.
Frederick A. Gust
BY Cox & Moore
ATTORNEYS.

Patented June 16, 1936

2,044,682

UNITED STATES PATENT OFFICE 2,044,682

RECEPTACLE HANDLE

Frederick A. Gust, Chicago, Ill.

Application November 7, 1935, Serial No. 48,742

3 Claims. (Cl. 16—114)

This invention relates to handles for receptacles, and particularly for handles adapted to be applied to receptacles having a detachable connection between the handle and the receptacle.

More specifically, the invention relates to a handle for a receptacle such as a coffee pot or percolator, said pot or percolator being provided with spaced fastening members to which the handle is attached.

The primary object of the invention is to provide a new and improved handle provided with means for adjustably securing the handle to a receptacle, coffee percolator or the like, the handle having a wide range of adjustability, whereby the handle may be applied to percolators or receptacles of various sizes.

Another object of the invention is to provide a handle provided with a plurality of spaced holes in one end thereof whereby one of said holes is brought into alinement with a fastening member on the receptacle, the other end of the handle being provided with a slot whereby a fastening member may clampingly hold the said end of the handle to the coffee pot in adjusted position, the handle having a wide range of vertical adjustability.

A further object of the invention is to provide a strong and durable device which may be readily and economically made, which can be quickly attached, and which has a wide range of adjustability whereby the handle is applicable for various sizes.

Numerous other objects and advantages will be apparent throughout the following specification.

The accompanying drawing illustrates a selected embodiment of the invention and the views therein are as follows:

Fig. 1 is a side elevation of a conventional coffee percolator and having the improved handle applied thereto.

Fig. 2 is an enlarged view of the handle showing the same applied to a receptacle, certain parts being broken away for the sake of clearness.

Fig. 3 is a detailed sectional view on the line 3—3 of Fig. 2.

Fig. 4 is a view similar to Fig. 2, showing a modified form of arrangement, the adjustable fastening arrangement being reversed.

Fig. 5 is a detail perspective view of a flame protector.

The particular handle herein shown for the purpose of illustration is adapted to be applied to a coffee percolator or other receptacle 6 having fastening members 7 which are held in position by means of protuberances, fastening clips or other holding elements 8 in the usual conventional manner.

Coffee percolators and other similar containers or receptacles are usually made in several sizes to accommodate the desires, uses or customs of the purchaser. Coffee percolators have a capacity of two, four, six and eight cups, and even larger. It has been cutomary to provide a detachable handle which is secured to the device in the manner just described. However, ordinarily the handles for the various sizes of percolators are not interchangeable as the distance between the upper fastening means 9 and the lower fastening means 10, which usually comprises a screw engaging the nut 7, is at certain spaced positions. Separate handles for each type or size is therefore necessary and causes the dealer or jobber to carry a plurality of these handles in stock to fit the various sized devices. The present invention obviates the necessity of providing a separate handle for each receptacle by the provision of an adjustable device which is capable of being attached and secured to receptacles of practically all sizes.

The new and improved handle 11, as shown in Figs. 1 to 3 inclusive, comprises an upper portion 12, a handle or grip portion 13, and upper and lower attaching portions 14 and 15 respectively. The lower portion 15, Fig. 2, is provided with a plurality of vertically spaced openings 16, any one of which is adapted to be brought into alinement with the screw-threaded opening in the nut 7. The fastening means 10 is adapted to be inserted through one of the holes 16 which is brought into alinement with the threaded opening in the fastening means, and then rotated to make a bolt and nut connection between the handle and the percolator. Each of the openings 16 comprises the narrow portion 17 and the enlarged or counter sunk portion 18 to receive the fastening means 10. The two sizes of the openings provide a shoulder 19 against which the head of the fastening means 10 abuts. The length of the fastening means 10 should be such that it is less than the distance from the outside of the percolator body to the shoulder 19.

The upper portion 14 is provided with a vertically extending elongated slot 20, which slot is arranged in alinement with the threaded opening in the nut 7, and this slot is of a sufficient length to compensate for the various adjustments provided by the openings 16. Therefore, regardless of which opening 16 the fastening means passes through, the slot will be in a position to receive the fastening means 9 to anchor or fasten the upper end 14 tightly against the projection 8 by means of the fastening member 9 passing through the slot 20 and threadingly engaging the nut 7. The slot 20 has a normal width just slightly larger than the body of the fastening means 7, but a counter sunk or cut-away portion 21, Fig. 3, is provided to provide a shoulder or bearing for the head of the fastening member 9.

The particular handle shown in Figs. 1 to 3 hereof, therefore, is adapted for various positions with respect to the body of the percolator. If the handle is to be applied or attached to one of the smaller types of percolators, the upper opening 16 would be brought into alinement with the opening in the nut 7 and the lower end of the handle would be held in position by means of the fastening member 10 passing through the upper opening 16 and threadingly engaging the nut 7 which is fixed with respect to the body of the percolator. If the distance between the upper and lower nut 7 and the fastening members 9 and 10 is relatively short, and the fastening means is passed through the upper opening 16, the position of the upper fastening means 9 would be toward the bottom of the portion 14. On a larger sized percolator or receptacle, the central opening 16 would be used with the fastening means 10 passing through the central opening and threadingly engaging the nut 7, as clearly shown in the drawing. In this intermediate sized percolater the upper and lower nuts 7 will be a little farther apart, and the chances are that the fastening means would be relatively positioned centrally of the vertical slot 20, as shown in the drawing. Where the large sized coffee pot or percolator is used, the bottom opening 16 is brought in alinement with the opening in the lower nut 7 and the fastening means is passed through the lower opening 16 to threadingly engage the nut 7. These larger type percolators have the upper and lower nuts 7 spaced relatively far apart, and therefore the upper fastening means 9 would be toward the upper end of the slot 20.

In Fig. 4 the openings 16 are shown at the upper end of the handle in the portion 14, while the slot is provided in the lower portion 15, the parts being merely reversed.

If desired, a flame protector 22 may be attached to the lower end, preferably on the end 15 of the handle. This flame protector comprises a flat body or attaching portion 23 which is adapted to engage the inside of the handle and the outside of the projection 8, as clearly shown in the drawing. Side extensions 24 project from the attaching portion 23 and protect the sides of the handle. A bottom portion 25 may be bent over from the back 23 and extend beneath the bottom of the handle to protect the bottom of the handle from the flame, such as when the percolator is over a gas fire. The body or attaching portion 23 may be provided with spaced holes or openings 26, which are spaced the same distance apart as the openings 16 and are therefore adapted to be brought into alinement with all the openings 16, as clearly shown in Fig. 2. Instead of having a plurality of spaced openings 26, as shown, a vertical slot may be provided in the body, said vertical slot being at least as long vertically as the distance between the upper and lower edges of the upper and lower openings 26. This adaptability of the handle makes it possible to position the handle at various elevations so as to make a balanced utensil.

When the lower end of the handle becomes charred and weakened, the charred end may be removed and the handle shifted downwardly to bring an uncharred section within the flanges 24 and 25, which flanges also serve to strengthen the elongated portion of the handle enclosed therein.

The invention provides a universal handle for application to percolators or other receptacles of various sizes, and may be easily attached to percolators already in use. The handle is universal in the respect that it will fit several sizes and types of percolators or receptacles. The same fastening means which are provided to secure the conventional handles to the percolator may be used for attaching the handle of the present invention to the percolator; and, therefore, it is not necessary for dealers or jobbers to maintain a stock of handles to fit several sizes of percolators or receptacles because the present handle is adjustable, so to speak, and is adapted to be easily and readily applied to several sizes of percolators. The handle embodying the present invention can be readily and economically manufactured, quickly and readily applied in position, usually with the old fastening means, and inasmuch as one handle will fit several types of coffee pots, it is not necessary for dealers to carry an inventory of various sized handles, and a resultant saving to the customer and housewife will be effected.

Changes may be made in the form, construction and arrangement of the parts without departing from the spirit of the invention or sacrificing any of its advantages, and the right is hereby reserved to make all such changes as fairly fall within the scope of the following claims.

I claim:—

1. A handle for percolators and other receptacles, comprising an upper portion adapted to be brought into engagement with a part of a percolator, a lower portion adapted to be brought into engagement with a part of the percolator, one of said portions being provided with a vertical slot, and the other of said portions being provided with a plurality of spaced holes, said slots and holes being adapted to receive fastening means to permit vertical adjustment of the handle bodily relative to the percolator.

2. A handle for percolators and other receptacles, comprising an upper portion adapted to be brought into engagement with a part of the percolator, a lower elongated portion adapted to be brought into engagement with a part of the percolator, one of said portions being provided with a vertical slot, the other of said portions being provided with a plurality of spaced holes to permit vertical adjustment of the handle relative to the percolator, and a flame protector having a plurality of openings therein to permit fastening means to pass therethrough at various positions, said protector having flanges to engage the sides and adjacent end of the handle whereby, upon removal of a charred end of the handle, a new section of the handle may be secured between the flanges.

3. A handle for a receptacle having upper and lower securing means, means on the handle for detachably engaging one of said securing means, and a plurality of means on another portion of the handle for selectively engaging the other of said securing means whereby the handle may be adjusted bodily with respect to each of said securing means and secured to the receptacle in a plurality of adjusted positions.

FREDERICK A. GUST.